United States Patent Office 3,520,846
Patented July 21, 1970

3,520,846
POLYETHYLENE TEREPHTHALATE FILM CONTAINING COBALTOUS ALUMINATE
Richard Jay England, Circleville, Ohio, assignor to E. I. du Pont de Nemours and Company, Wilmington, Del., a corporation of Delaware
No Drawing. Filed Nov. 1, 1966, Ser. No. 591,123
Int. Cl. C08g 51/04; C08k 1/02
U.S. Cl. 260—40
9 Claims The present invention relates to polyethylene terephthalate and, more particularly, is directed to improvements in and relating to polyethylene terephthalate having a low apparent yellow color and having dispersed therein a blue pigment and a process of manufacture therefor.

The present invention is generally applicable to polyethylene terephthalate and preferably shaped structures thereof such as, for example, films and fibers, and these may be transparent or non-transparent as may be desired. Because of the commercial importance of polyethylene terephthalate film structures, such material constitutes the preferred shaped structure of the present invention, and the invention will be described hereinafter with specific reference to polyethylene terephthalate film structures.

Polyethylene terephthalate is a well-known thermoplastic polymeric material and is described in, for example, U.S. Pat. 2,465,319 to Whinfield and Dickson. It is also known to prepare shaped structures such as, for example, self-supporting films of polyethylene terephthalate by extruding the molten polymeric material through a suitable orifice followed by quenching the amorphous polymeric material in film form. Such film, although possessing many excellent inherent physical properties, is not competitive in other respects, such as, for example, tensile strength, with film structures of other types of polymeric material. Thus, as is now well known, processes have been evolved to improve the properties of polyethylene terephthalate such as, for example, by elongating, as by stretching, film structures of substantially amorphous polyethylene terephthalate whereby to orient the film structure and impart thereto greatly enhanced physical property levels. In such processes as described, for example, in U.S. Pats. 2,823,421 to Scarlett and 2,995,779 to Winter, the thermoplastic material is melt-extruded through an orifice to form a film which is then quenched in order to obtain a substantially amorphous film of polyethylene terephthalate. Thereafter, the amorphous film is heated to a temperature within a specified temperature range and is oriented as by stretching the film biaxially a specified amount. If desired, the biaxially stretched film may be dimensionally stabilized as by heat-setting in the conventional manner by subjecting the film to heat-setting temperatures of 150° C. to 250° C. One serious drawback of the above described film structures of polyethylene terephthalate is that regarding the appearance thereof in terms of its color or color uniformity. Specifically, polyethylene terephthalate and shaped structures thereof are characterized by a very slight yellow color which renders such polyethylene terephthalate unsuitable for special applications such as, for example, transparent film structures and other uses requiring clear and non-colored film structures. It is, therefore, the principal object of the present invention to provide a novel polyethylene terephthalate and shaped structures thereof such as self-supporting films characterized by improved color uniformity. A further object of the present invention is to provide a pigment for polyethylene terephthalate having the proper hue and tinctorial capacity to mask the yellowness thereof and produce film structures thereof having a substantially neutral hue.

According to the present invention there is provided a composition comprising polyethylene terephthalate and cobaltous aluminate. The cobaltous aluminate is preferably characterized by a particle size of up to about three microns and is present in the polyethylene terephthalate in an amount preferably of between about 25 and about 1200 parts per million, based upon the polyethylene terephthalate. In one of several preferred embodiments, the present invention comprises a film structure of polyethylene terephthalate having uniformly dispersed therein cobaltous aluminate of a particle size preferably up to about three microns in an amount preferably between about 25 and about 1200 parts per million, based upon the polyethylene terephthalate.

According to the present invention, there is further provided a process for preparing a substantially neutral composition of polyethylene terephthalate which comprises adding into and uniformly dispersing throughout said polyethylene terephthalate cobaltous aluminate of a particle size preferably up to about three microns and in a concentration preferably between about 25 and about 1200 parts per million, based upon said polyethylene terephthalate. In a preferred embodiment, the process of the present invention comprises reacting terephthalic acid or a low molecular weight alkyl ester thereof such as dimethyl terephthalate with ethylene glycol under ester interchange conditions to form bis-2-hydroxyethyl terephthalate; polymerizing said bis-2-hydroxyethyl terephthalate and adding cobaltous aluminate and thereafter extruding the resulting polyethylene terephthalate through a slot orifice thereby to obtain a film structure thereof having uniformly dispersed throughout said film structure cobaltous aluminate of particle size preferably up to about three microns in an amount preferably between about 25 and about 1200 parts per million, based upon said polyethylene terephthalate.

The nature and advantages of the polyethylene terephthalate composition and shaped structures thereof of the present invention will be more clearly understood from the following description thereof.

The polyethylene terephthalate of the present invention is derived from the polycondensation reaction between terephthalic acid and ethylene glycol in the manner set forth in the above mentioned U.S. Pat. 2,465,319 to Whinfield and Dickson utilizing polycondensation catalysts also described in said U.S. Pat. 2,465,319.

The present invention provides a composition of the above described polyethylene terephthalate and shaped structures thereof characterized by a neutral hue. The neutral hue is imparted to the polyethylene terephthalate by the presence therein of an effective amount of cobaltous aluminate. The concentration of the cobaltous aluminate in the polyethylene terephthalate is only that which is necessary for obtaining polyethylene terephthalate having a substantially neutral hue. The concentration of cobaltous aluminate necessary in each instance does, of course, depend upon the degree of yellowness of the initial polyethylene terephthalate, and may be easily determined in each instance in the manner as is set forth in Example 2 herein. The amount of cobaltous aluminate that is sufficient for imparting a neutral hue to the polyethylene terephthalate ranges in most instances from about 25 to about 1200 parts per million, based upon the polyethylene terephthalate.

The cobaltous aluminate in the polyethylene terephthalate of the present invention is characterized by a particle size adequate for processing the polyethylene terephthalate composition without clogging the filter elements utilized in the processing apparatus. Another consideration effecting the choice of particle size of the cobaltous aluminate is that the ultimate composition and shaped structures thereof should be characterized by uniformity of color or hue. That is, the cobaltous aluminate should not be of too great a particle size as would easily cause localized accumulation or agglomeration thereof thereby resulting in non-uniform distribution thereof through the polyethylene terephthalate. A particle size of the cobaltous aluminate of up to about three microns has been found to be satisfactory and, therefore, such size is preferred.

The principle and practice of the present invention will now be illustrated by the following examples which are exemplary only and it is not intended that the invention be limited thereto since modifications in technique and operation will be apparent to anyone skilled in the art.

The test samples of the polyethylene terephthalate prepared in the following examples were evaluated in accordance with the following testing procedure:

*Color.*—The color test was performed in order to obtain a measure of the yellow tint of the film test samples utilizing the "Colormaster Model V Differential Colorimeter," manufactured by Manufacturer's Engineering Equipment Company of Hatboro, Pa. The "Colormaster" instrument was employed in accordance with the method and procedure described in ASTM D-1536-58-T as adapted to transparent and translucent film structures, and the results were interpreted by utilizing a modified Adams color coordinate system. The modified Adams color coordinate system for describing color that was employed was based upon a three-dimensional color model in which lightness (L), green-red (a) and yellow-blue (b) are presented as the coordinates of a three-dimensional graph. The modified color coordinate system that was employed herein omitted the L factor since lightness is not a variable in the present invention and, therefore, the modified coordinate system was essentially a two-dimensional coordinate system wherein $a$ and $b$ represented the axes thereof, and as thus modified the system is descriptive of the true color appearance of the test film structures. Thus, the modified color coordinate system may be constructed by designating the horizontal axis as the $a$-axis on which the negative numerical values appear to the left of the zero point (point of intersection) thereon and the positive values appear on the right and these represent, respectively, the green and red characteristics of color. The ordinate or vertical axis of the coordinate system is designated the $b$-axis and made to intersect the $a$-axis at the zero point thereon. Positive values on the $b$-axis are presented on the portion thereof above the $a$-axis and the negative values are presented below the $a$-axis and the former represent yellow color, whereas, the later represent blue color.

The test film samples evaluated were of three mil thickness. It was found in the present invention that the value of the $a$ characteristic (red-green) of the test film samples was not significantly variable. Thus, it was found sufficient in the present invention to use only the $b$ characteristic to measure the yellow-blue balance in the test film samples. Thus, the measurements appearing in the examples hereinafter refer only to the $b$ value of the modified color coordinate system.

EXAMPLE 1

Cobaltous aluminate pigment was metered into molten polyethylene terephthalate having a yellowness value of about 2.1 in the amounts indicated in Table 1 below. The polyethylene terephthalate and cobaltous aluminate mixture was extruded through a slot orifice onto a quench drum maintained at 35° C. and the resulting film structure was thereafter stretched to 2.8 times its initial length and 3.0 times its width to provide an oriented polyethylene terephthalate film structure having a thickness of 0.003 inch. The color measurements of the biaxially oriented film structure in accordance with the "Colormaster" instrument and modified color coordinate system above described are presented in Table 1 herebelow:

TABLE 1.—EFFECT OF VARIOUS LEVELS OF COBALTOUS ALUMINATE ON FILM YELLOW COLOR

| Sample | Quantity of $Co(AlO_2)_2$, p.p.m. | Yellowness, Index $b$ |
| --- | --- | --- |
| (a) | (Control)* 0 | +2.1 |
| (b) | 100 | +1.5 |
| (c) | 300 | +0.9 |
| (d) | 600 | +0.1 |
| (e) | 900 | −0.6 |
| (f) | * 1,200 | −1.6 |

* Visually, the control was a definite yellow color and the sample containing 1200 p.p.m. pigment was a "sky" blue. Thus, colorless film in the above table would require about 500 p.p.m. of the $Co(AlO_2)_2$ pigment.

EXAMPLE 2

A series of test samples were evaluated in the manner of Example 1 above to establish a basis for the controlled addition of cobaltous aluminate pigment to a series of polyethylene terephthalate samples each having different yellow $b$ index values whereby to provide in each instance substantially neutral polyethylene terephthalate. The quality of cobaltous aluminate pigment in parts per million, as a function of the $b$ index value was plotted on graph paper having rectangular coordinates, and the quantity of cobaltous aluminate pigment necessary to reduce the polyethylene terephthalate to an essentially neutral color is easily determined from the resulting graph. Two types of polyethylene terephthalate film were evaluated: (1) that which is normally hazy and, (2) that which normally is clear. The quantity of cobaltous aluminate required varied slightly over a relatively narrow range depending upon the initial color of the polyethylene terephthalate. For the hazy type film, it was found that a change of 1.1 to 2 yellow $b$ index units occurred for each addition of 100 parts per million of cobaltous aluminate, thus showing that from 50 to 100 p.p.m. of cobaltous aluminate is required for changing the yellow $b$ index an amount of about one unit. For the clear type film, which is known to contain an acidic derivative of a phosphoric acid which may have had an effect on the pigment requirement, a change of 0.30 yellow $b$ index units occurred upon addition of 100 p.p.m. of cobaltous aluminate or, in terms of the quantity to be added to effect a neutral hue, a concentration of about 300 parts per million of cobaltous aluminate is required to effect a change of one unit of the $b$ index. Thus, it is readily apparent that the quantity of colbaltous aluminate pigment necessary to produce substantially neutral film of polyethylene terephthalate can be easily determined in all instances.

The cobaltous aluminate above described is an essential and necessary element of the invention. The effect of cobaltous aluminate when incorporated in polyethylene terephthalate to balance or mask the inherent yellow hue of polyethylene terephthalate without imparting other shades thereto such as, for example, green or red hues, is totally surprising and unexpected. To illustrate, a well known blue pigment Monastral® which has a very high brightness and a high tinctorial strength and, therefore, is operable at very low concentrations, is not suitable for overcoming the problem of yellowness that is characteristic of polyethylene terephthalate because it imparts a greenish or turquoise hue instead of a neutral shade to the polyethylene terephthalate. Also, pigments such as Irgazine Violet BLT® cause a shift in the red direction. Thus, it was found in the present invention that cobaltous aluminate corrects the yellow color or hue of polyethylene terephthalate to a neutral hue (as observed in natural sunlight or under most artificial conditions), and is operable or effective at low concentrations and at a particle size which does not foul or otherwise complicate the processing of polyethylene terephthalate as by the accumulation of agglomerates of the pigment on filter systems. Furthermore, there is a linear relationship between the concentration of cobaltous aluminate pigment required for correcting the initial color of polyethylene terephthalate, a factor which makes precise in-process adjustment possible. Furthermore, the inorganic cobaltous aluminate pigment is inert in the ester interchange reaction and to the polymerization catalysts employed so that it can be added early in the ester interchange step and continue in the reaction system throughout the entire process without adverse effect on the final product and without alteration of the pigment.

Another desirable feature of the cobaltous aluminate pigment is that it is color stable under processing conditions of polyethylene terephthalate and, therefore, it can be added at any convenient point in the polymer forming process, or with recycled polymer. The cobaltous aluminate pigment has been added in glycol slurry after the ester exchange column wherein dimethyl terephthalate is converted to the monomer, i.e., dihydroxy ethyl terephthalate, either as a mixture of the pigment with terephthalic acid and ethylene glycol, or just before the polymerization or the finisher stage. Also, the cobaltous aluminate pigment has been added to the finished polymer with neutral fillers, and has also been dispersed on polymer flakes in a screw-type mixture-extruder having ports on the barrel for additions.

What is claimed is:

1. A composition comprising polyethylene terephthalate and cobaltous aluminate, the composition being characterized by a substantially neutral hue.

2. The composition of claim 1 wherein said cobaltous aluminate is characterized by a particle size of up to about three microns and is present in an amount between about 25 and about 1200 parts per million, based upon said polyethylene terephthalate.

3. An article of manufacture comprising a clear film structure of polyethylene terephthalate having a cobaltous aluminate uniformly dispersed therein and characterized by a substantially neutral hue.

4. The article of manufacture of claim 3 wherein said cobaltous aluminate is of a particle size up to about three microns and is present in an amount between about 25 and about 1200 parts per million, based upon the polyethylene terephthalate.

5. The article of claim 4 wherein said film structure is biaxially oriented and dimensionally stabilized.

6. A process for preparing polyethylene terephthalate which comprises adding into and uniformly dispersing throughout said polyethylene terephthalate cobaltous aluminate to impart a substantially neutral hue.

7. The process of claim 6 wherein said cobaltous aluminate is characterized by a particle size up to about three microns and in an amount between about 25 and about 1200 parts per million, based upon the polyethylene terephthalate.

8. A process of manufacture for preparing film structures of polyethylene terephthalate which comprises reacting terephthalic acid or a low molecular weight alkyl ester thereof with ethylene glycol to form bis-2-hydroxyethyl terephthalate; polymerizing said bis-2-hydroxyethyl terephthalate and adding cobaltous aluminate to obtain polyethylene terephthalate having a substantially neutral hue, nad extruding said polyethylene terephthalate to form a substantially neutral film structure thereof having said cobaltous aluminate uniformly dispersed throughout said film structure.

9. The process of claim 8 wherein said cobaltous aluminate is characterized by a particle size up to about three microns and in an amount between about 25 and about 1200 parts per million, based upon the polyethylene terephthalate.

References Cited

UNITED STATES PATENTS

| 2,884,663 | 5/1959 | Alles | 260—288 |
| 3,350,336 | 10/1967 | Kelley | 260—40 |
| 3,026,283 | 3/1962 | Schlegel | 260—40 |

FOREIGN PATENTS

| 753,880 | 8/1956 | Canada. |

OTHER REFERENCES

Encyclopedia of Chem. Technology, vol. 5, pp. 744–745, TP9E68, 1963, C.3.

MORRIS LIEBMAN, Primary Examiner

L. T. JACOBS, Assistant Examiner